J. Whitworth.
Knitting Loom.

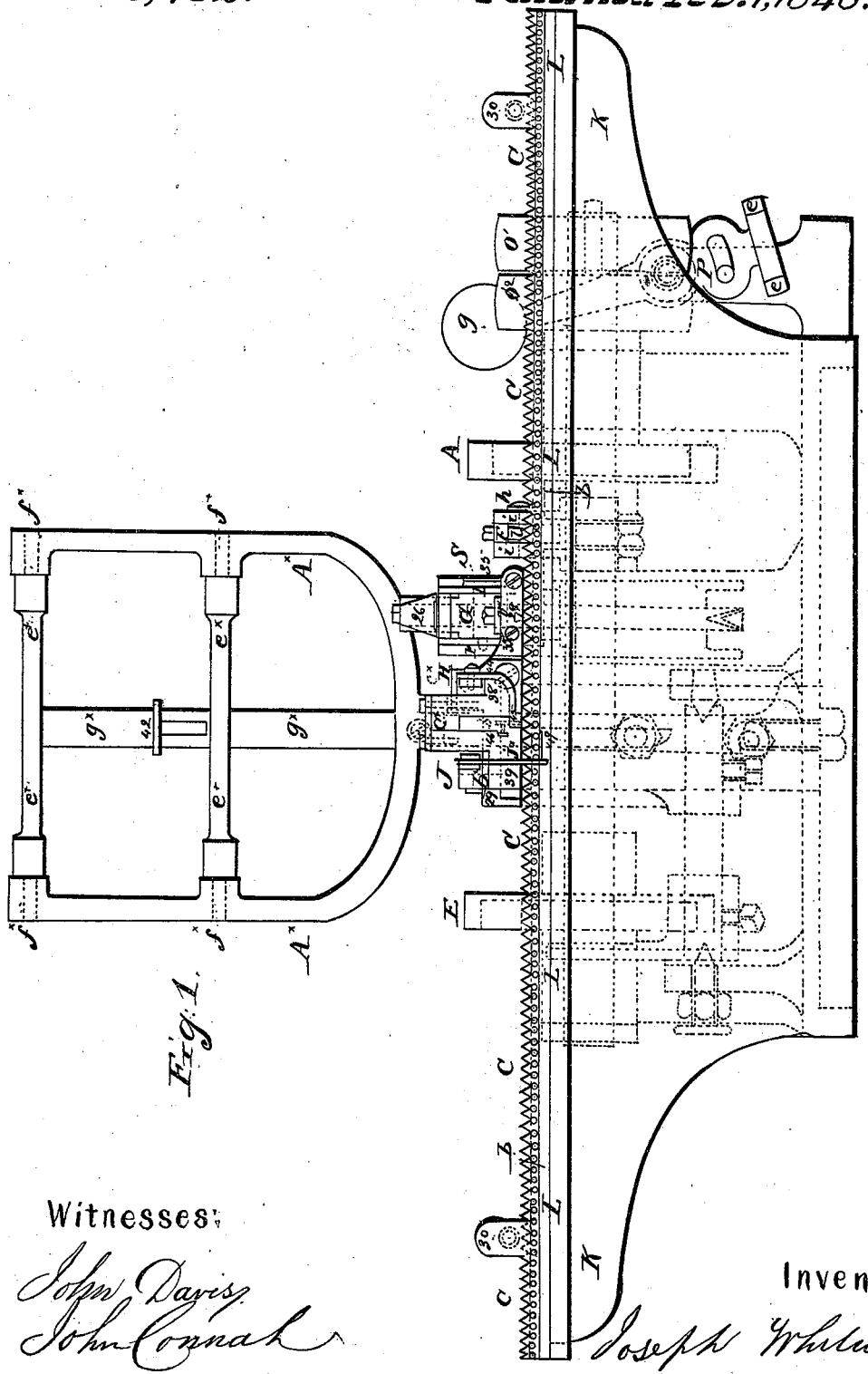

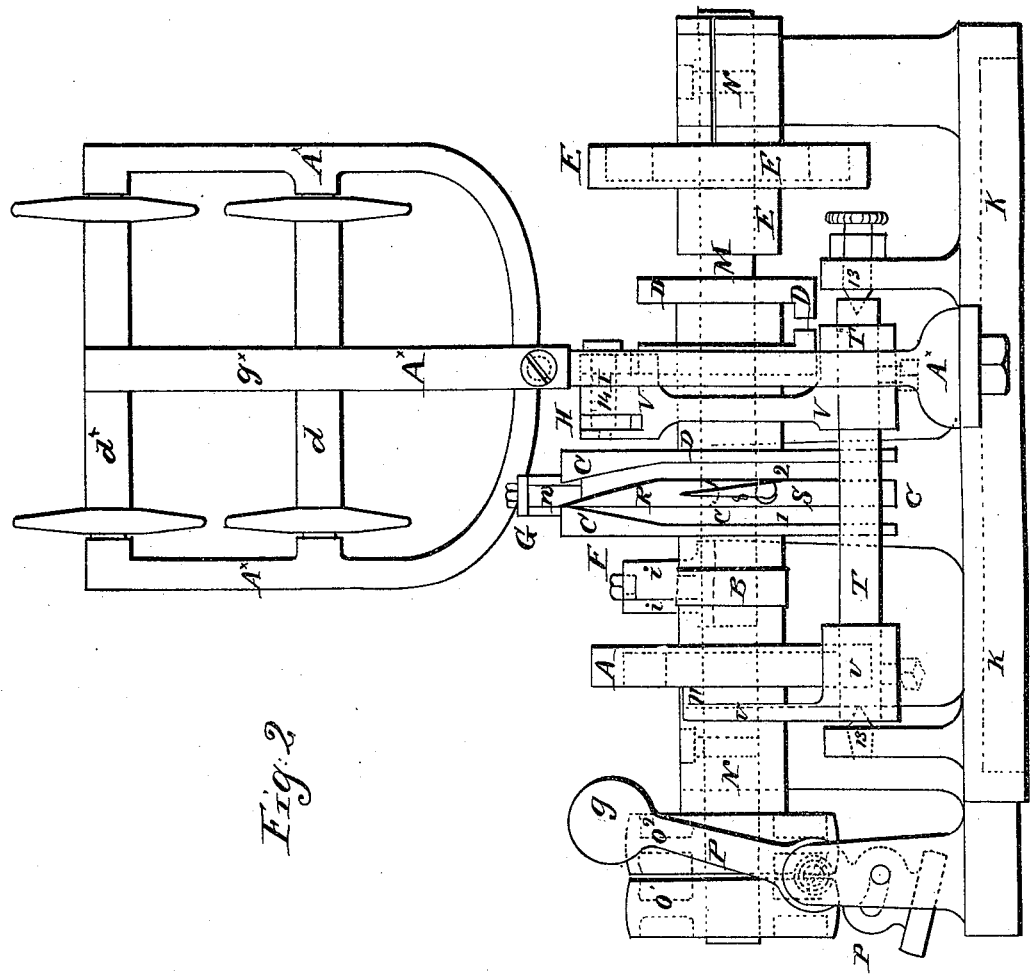

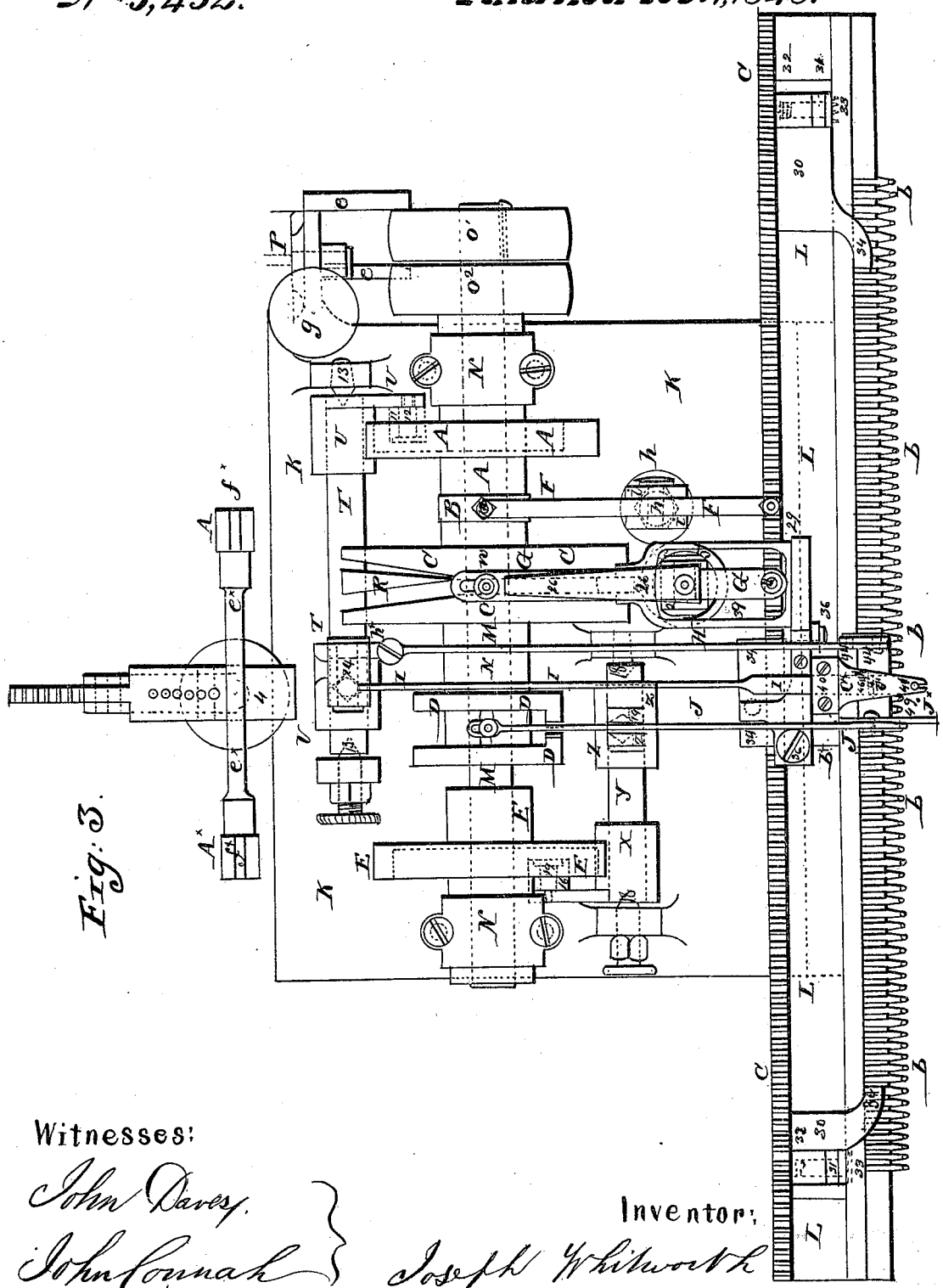

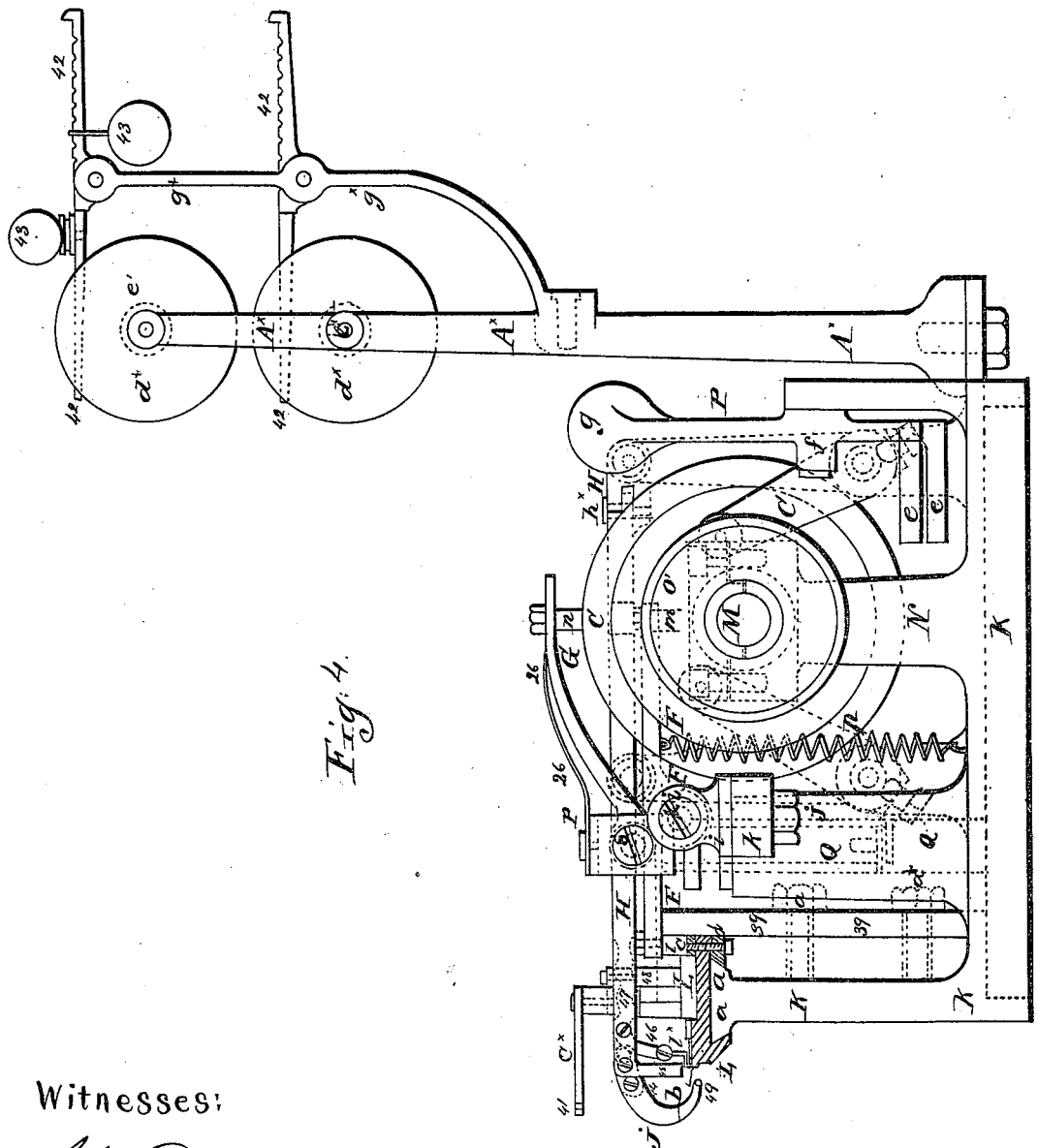

No. 5,432. Patented Feb. 1, 1848.

Sheet 5 – 7 Sheets.

Witnesses:
John Davey
John Connah

Inventor:
Joseph Whitworth

Sheet 6-7 Sheets.
J. Whitworth.
Knitting Loom.
N°5,432. Patented Feb. 1, 1848.
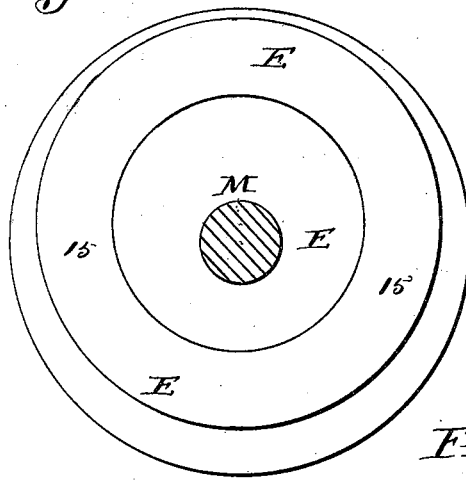
Fig. 12.
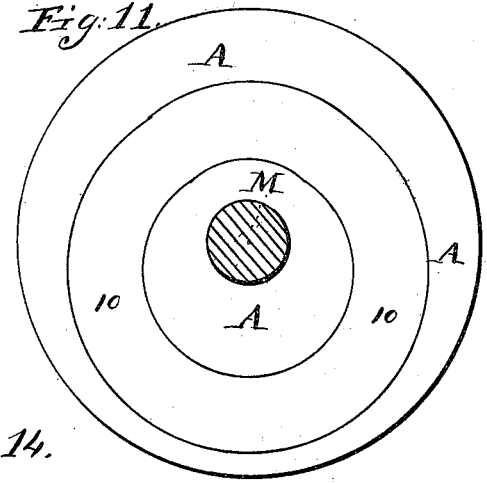
Fig. 11.
Fig. 14.
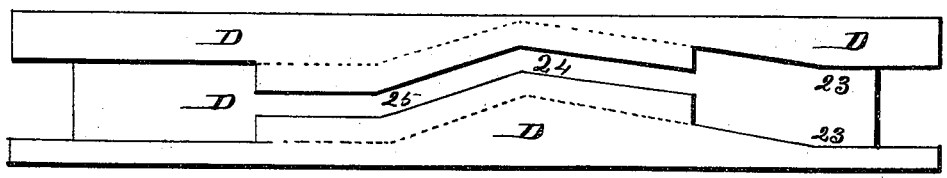
Fig. 13.
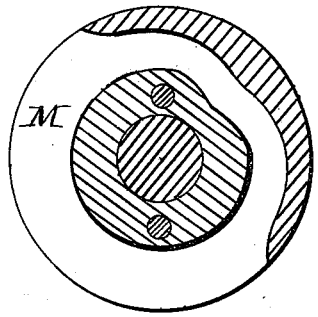
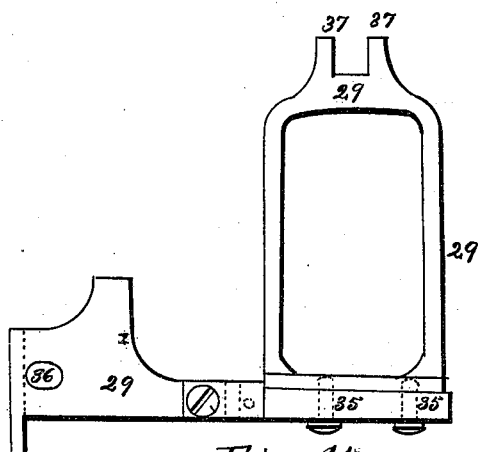
Fig. 15.
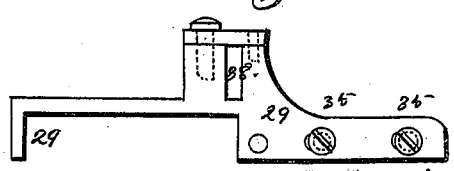
Witnesses:
John Davies
John Connah
Inventor:
Joseph Whitworth

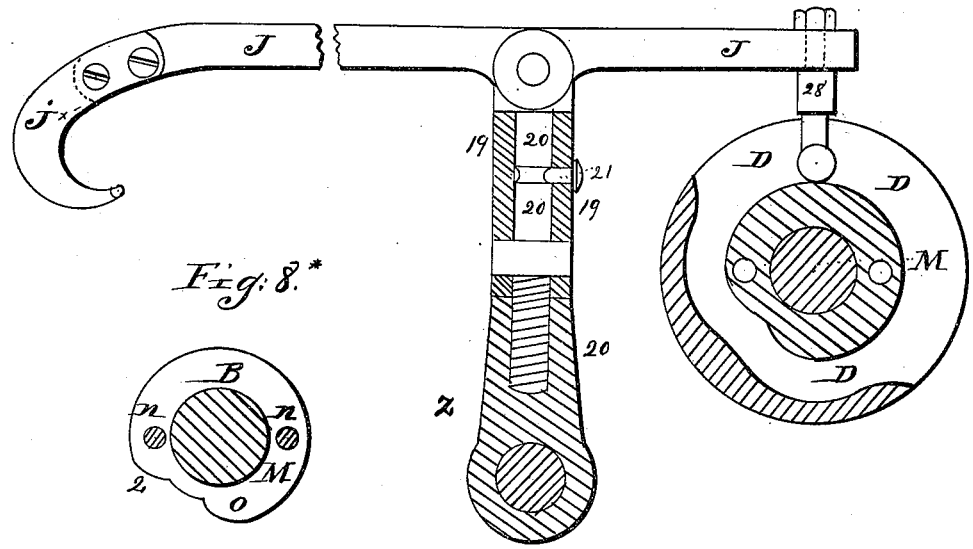

UNITED STATES PATENT OFFICE.

JOSEPH WHITWORTH, OF MANCHESTER, ENGLAND.

IMPROVEMENT IN MACHINERY FOR KNITTING.

Specification forming part of Letters Patent No. 5,432, dated February 1, 1848.

*To all whom it may concern:*

Be it known that I, JOSEPH WHITWORTH, engineer, of Manchester, England, a subject of the Queen of Great Britain, have invented Improvements in Machinery for Knitting; and I do hereby declare that the following is a full and exact description of my said invention—that is to say:

My invention consists of improvements in that description of machinery for which Letters Patent were granted to me, in conjunction with John Wilde, on the 10th day of November, 1835, in England, which machinery produced knitted fabrics by means of a series of vertical needles fixed to a bar which progressively moved past a peculiar arrangement of apparatus by which a loop was made on each needle in succession and drawn through the loop previously on the needle, all which will be found fully described by referring to the specification enrolled to such Letters Patent. Now according to my present improvements, in addition to having arranged the machine so as to use the bar with needles out of the vertical position and so that the work as it is produced may hang on and below the needles, I have made several improvements in some of the parts or instruments of the apparatus for producing the stitches or loops on the needles, and also in the cams which give motion to such instruments or parts of the apparatus, and I have also improved the construction and arrangement of the bar which carries the needles and the means of giving motion to such bar, and in order that my invention may be fully understood and readily carried into effect I will proceed to describe the means pursued by me.

In the accompanying drawings of my improved machine for knitting, Figure 1 is a front elevation on a scale equal to the real size. Fig. 2 is a back elevation. Fig. 3 is a plan or horizontal view. Fig. 4 is an end view of the machine.

The several cams by which the operating parts of the mechanism are actuated are technically called as follows:

A is the back rocking-shaft cam; B, the retention-cam; C, the chamfered slide-traversing cam; D, the presser-cam, and E the front rocking-shaft cam.

I now proceed to give the names of the bars. F is the retention-lever bar; G, the traverse-lever bar; H, the feeder-bar; I, the lifting-hook bar, and J the presser-lever bar.

K is a frame having a bearing formed at $a$ on a part of it perpendicular to its base.

Figure 5:
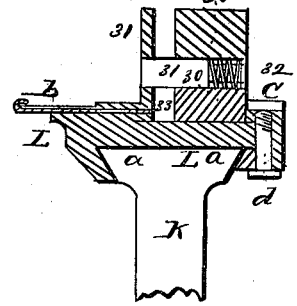

L is a chamfered slide moving to and fro longitudinally upon the bearing $a$ in a manner similar to the rail or bar upon the rollers in my former machine. The chamfered slide L, which is shown on an enlarged scale equal to double the real size detached at Fig. 5, carries in front the horizontal needles or hooks $b$, which are inserted and secured into conical holes. The upper portion of these holes is cut away to allow the lifting-hook $i^*$, hereinafter described, to get under the stitch, and a support is thus preserved under the needles by the remaining portion of the holes. The holes just named are also made longer than what is required for the needles $b$, (see enlarged view, Fig. 5,) for the purpose of fixing with certainty the stop or reversing pieces 30.

$c$ is a rack, which is of the same pitch or gage as the needles, and is fixed by screws $d$ on the back part of the chamfered slide L.

Figure 6:
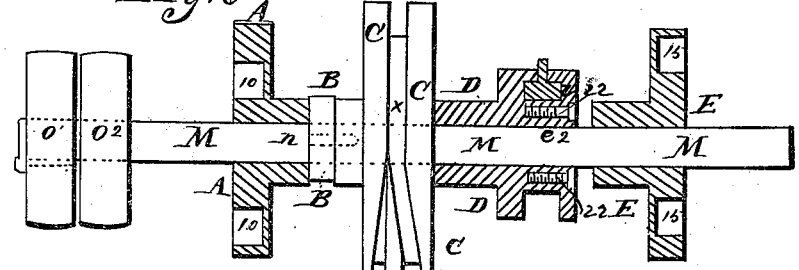

M is the main driving-shaft of the machine, revolving in bearings or plummer-blocks N and carrying the fast and loose pulleys $O'$ $O^2$ and the several cams before mentioned. The shaft, with its pulleys and several cams, is shown detached at Fig. 6. The fast pulley $O'$ and loose one $O^2$ on the rotary driving-shaft M may be driven by a strap and shifted upon either of the pulleys by the lever-guide P, which has a fork $e$ and a fulcrum $f$. The weight $g$ at its upper extremity retains the strap on the pulley to which it may have been shifted. F is a retention-lever bar, which, with its actuating retention-cam B, is shown detached at Fig. 7. It retains the chamfered slide L in a fixed position during a part of the operation. The fulcrum of the retention-lever bar F has a pin $h$, which passes through corresponding holes in the retention-lever F and fulcrum-piece $i$, which latter is fixed by a screw and nut $j$ to a part $k$, projected from the pillar Q. A piece $l$, fixed on one end of the retention-lever bar, takes into a space of the rack $c$, and the stud $m$ at the other end, by the action of the helical spring $p$, bears upon the retention-lever cam B, which is fixed by the pins $n$ to the side of and carrid round with the chamfered slide-traversing cam C, which latter is fixed to the rotary shaft M. As the inclined part O of the retention-lever cam B (shown detached at Figs. 8* and 7) passes under the stud $m$, the retention-lever bar F is raised by the helical spring $p$ out of the rack $c$ and is again fixed into it by the part $q$.

Figure 10:
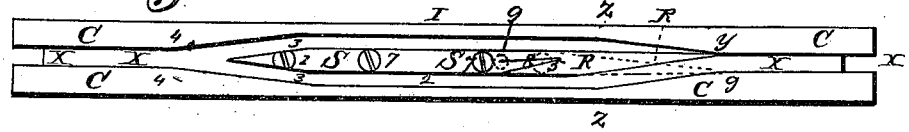

G is a traverse-lever bar, (shown at Fig. 8,) the use of which is to cause the chamfered slide L to traverse to and fro longitudinally, which motion it receives from the chamfered slide-traversing cam C. The traverse-lever bar G has two fulcra, in order that it may be moved laterally or vertically either separately or combined. The fulcra-piece $r$ has at its upper end a rectangular opening in which the traverse-lever bar G is placed. A pin S, which passes through the lever G and fulcra-piece $r$, forms a joint. The lower end of the fulcra-piece $r$ is made circular and is fitted loosely into a bush $t$, screwed, for the purpose of adjustment, into the pillar Q, which pillar, for convenience, is cast on the base of the frame K. The screw and washer $u$ at the lower part of the bush $t$ keep the fulcra-piece $r$, to which they are attached, into its proper position. A piece $v$, made at its lower end to fit the spaces of the rack $c$, is secured to one extremity of the traverse-lever bar G. A stud $u$, fixed to the other extremity, bears by the pressure of the flat spring 26 in the groove of the chamfered slide-traversing cam C, by which it is actuated. The chamfered slide-traversing cam C is fixed by a set-screw to the rotary shaft M, and by means of the traverse-lever bar G causes the chamfered slide L to traverse longitudinally to and fro upon the bearing $a$. It is shown detached at Figs. 9 and 10. In order to exhibit its peculiarities more fully, it is shown with its periphery supposed to be converted into a plane.

$x$ is a parallel straight groove, the sides of which diverge at $y$ obliquely right and left until they reach the point $z$ of the two parallel straight grooves 1 and 2, where they take an opposite course at 3 and converge again at 4 to the straight groove $x$.

R is a wedge-formed segment having a joint 5, upon which it is movable. It is secured to the chamfered slide-traversing cam C by the pin and collar 6 on the joint 5. Another wedge-formed segment S, which is, however, not movable, is fastened by the screws 7 beyond the former segment R. The movable wedge-formed segment R, on being shifted, as shown by full and dotted lines, Fig. 10, to either of the oblique sides $y$, causes the traverse-lever bar G to move laterally, which motion it communicates to the chamfered slide L, as before explained.

Figure 8:
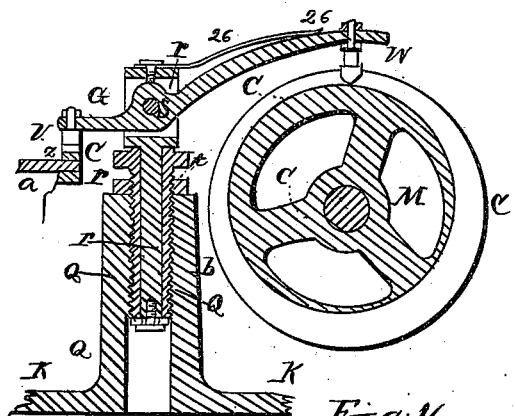
Figure 9:
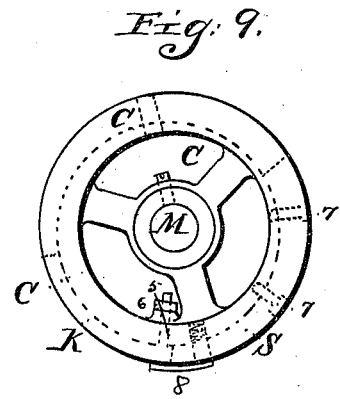

In order when necessary to reverse the longitudinal motion of the chamfered slide L, carrying the needles $b$, the smaller wedge 8 is made as it revolves to strike against one of the edges 37 of the reversing-piece 29, which causes the movable wedge-formed segment R to move to the opposite oblique side of the groove, in which position it is retained by the helical spring and conical pin 9. The manner in which the reversing-piece is made to present one of its edges, when necessary, to the action of the smaller wedge 8 will be explained hereinafter. A portion of the chamfered slide-traversing cam C at the bottom of the groove, as shown in Figs. 8 and 9, is made eccentric for the purpose of causing the traverse-lever bar G to take into the rack when it is required to move the chamfered slide L laterally. A is the back rocking-shaft cam shown detached at Fig. 11. It is fixed by a set-screw on the rotary shaft M, and is for the purpose of imparting the necessary horizontal reciprocating motion by means of the back rocking shaft T to the feeder-bar H and lifting-hook bar I in a manner which I now proceed to explain. The back rocking-shaft cam A has an eccentric groove 10 formed on one of its sides, in which groove a roller 11 works on a stud or pin 12, screwed fast to the extremity of the oscillating lever U. The back rocking shaft T, working between the centers 13, has fixed on one end the oscillating lever U and on the other end is fixed the lever V. The upper part of this last-mentioned lever V is made so as to receive one end of the feeder-bar H and lifting-hook bar I, where a joint is formed by a pin 14. As the back rocking shaft cam A revolves, an oscillating movement is imparted by means of the oscillating lever U to the rocking shaft T, which causes the lever V, fixed on another part of the rocking shaft T, to impart the necessary horizontal reciprocating motion to the feeder-bar H and lifting-hook bar I.

E is the front rocking-shaft cam, (shown detached at Fig. 12,) which is fixed by a set-screw on and toward the other end of the rotary shaft M. Its purpose is to impart the requisite horizontal reciprocating motion to the presser-lever bar J, which, as will be seen by the description, is effected in a similar manner to that just described. The front rocking-shaft cam E has an eccentric groove 15 formed on one side, in which works the roller 16 on the stud 17, screwed fast to the extremity of the oscillating lever X. The front rocking shaft Y, working between the centers 18, has fixed on it the two levers X and Z—namely, one on each end. 19 is a fulcrum-piece having a pin at its upper end, which passes through it and the presser-lever bar J, thus forming a joint. The fulcrum-piece 19 has a vertical hole in which a stud 20 is placed, upon which it swivels. The stud 20 is screwed fast at its lower end into the lever Z, by which means the fulcrum-piece 19 may be adjusted vertically. The stud 20 has a circular groove in which the screwed pin 21 works and prevents the fulcrum-piece 19 from rising or falling. The presser-cam D is shown detached at Fig. 13 and also at Fig. 14, with its periphery supposed to be a plane, in order to exhibit its form more distinctly. Its use is to communicate a lateral and vertical motion to the presser-lever bar J, which motions require the peculiar construction of the lever Z, previously described. The presser-cam D is made, for convenience of construction, in two parts, which are fastened by the screws 22. It has a groove, which at the point 23 takes an oblique course until it reaches the point 24 where it takes an opposite oblique course more sudden than the former until it reaches the point 25. The groove is then straight from this last point to the one first mentioned, A T-formed piece 28, secured to one extremity of the presser-lever bar J, is inserted in the groove of the presser-cam D, and by that means the motions of the presser-cam D as it revolves are conveyed to the presser-lever bar J.

I now proceed to explain the manner in which the reversing-piece 29 is made to present either of its edges 37 to the action of the small wedge 8 on the chamfered slide-traversing cam C, and by that means change the direction in which the chamfered slide L, carrying the needles, is moved longitudinally, so that the knitting may be of any required width within the limits of the machine.

30 are two stop-pieces, (shown in section in enlarged view, Fig. 5,) which are fitted loosely on the upper side of the chamfered slide L. Both the stop-pieces 30 have a pin-plate 31, which fits loosely into a hole in which is inserted a helical spring 32, which presses against the pin-plate 31. A number of small pins at 33 are riveted in the pin-plate 31, which pins are forced by the helical spring 32 into the back part of the holes in which the needles $b$ are inserted. The curved part 34 is made to point to the needle where the knitting is to terminate. The stop-pieces require to be of different lengths, because the extremities of the reversing-piece 29, now about to be described, project farther on side of the hole 45 in the feeder-bar H than on the other.

Figure 16:
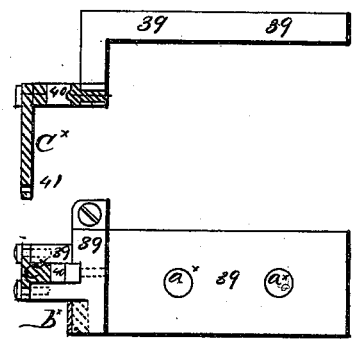

The reversing-piece 29 (shown detached at Fig. 15) is made, for convenience, in two parts, which are screwed together by the screws 35. The screws 36, with the slotted holes, form a guide for the reversing-piece to slide in when moved laterally by either of the stop-pieces 30, so as to present one of its edges 37 to the action of the small wedge 8, and thus change the direction in which the chamfered slide L is moving longitudinally. The reversing-piece 29 has an opening at 38, through which the feeder-bar H passes. A bracket 39 (shown detached at Fig. 16) is fixed by screws $a^*$ to the back of the perpendicular part of the frame K. A hard piece of wood $b^*$, inserted in the bracket 39, forms a rest for the presser-lever bar J. An opening 40 has passing through it the lifting-hook bar I. The upper part of the opening is covered with the yarn-guide $c^*$, which has a hole 41, through which the yarn is conducted to the feeder. A* is the bobbin-stand carrying the two bobbins $d^*$, running on spindles $e^*$ in bearings $f^*$.

One only of the bobbins is used, except when it is necessary to make the knitting of additional thickness—as, for instance, in the heel of a stocking—in which case the lower bobbin carries the yarn for the additional thickness and the upper bobbin the ordinary yarn, which two yarns are conducted through the guide-hole 41. The arm $g^*$ projects from the bobbin-stand A*, carries the upper and lower balance-levers 42, which are provided with holes and notches in order to regulate by means of weights 43 the required pressure upon the yarn. The feeder-bar H conducts the yarn from the bobbin to the needles, and is actuated by the lever V, as before explained. $h^*$ is a joint made in order to enable the feeder-bar H to move laterally with the reversing-piece 29, when it changes the direction in which the chamfered slide moves. The lateral motion is required in order that the feeder-bar H may always be in advance of the lifting-hook bar I. A curved piece 44 is fixed by screws, for convenience, to the feeder-bar H. The yarn or yarns are conducted through the hole 45 in the curved piece 44 and placed upon the needles $b$ by means of the reciprocating motion which the feeder-bar H receives from the lever V, fixed on the back rocking shaft T, which motion is repeated at each revolution of the rotary shaft M, as has been before explained. I is the lifting-hook bar which lifts the loop or stitch. It is shown detached at Fig. 17. One end of the lifting-hook bar I is connected to the lever V, as before described. At the other end is the hook $i^*$, fitted into a hole and secured into it by the set-screw 46. At or near its extremity the lifting-hook bar I has on its upper and lower sides a series of undulating curves, which pass through the opening 40 on the bracket 39. At the top and bottom of the opening 40 are inserted two circular pieces, which act as guides to the series of undulating curves, and by that means as the lifting-hook bar I is moved forward and backward it is successively raised and lowered in order to lift the stitch or loop, which operation is effected in the following manner: The upper curve 47 of the series of undulating curves on passing through the guide 40 lowers the hook into the groove formed in the back part of the needle. The lower curve 48 as it passes through the guide 40 lifts the hook, which has then hold of a stitch or loop previously formed. The stitch or loop is then carried forward by the lifting-hook bar I beyond the front of the needles, where the stitch or loop is liberated from the hook $i^*$ by the pin 49 of the presser-lever bar J, now about to be described. The lifting-hook bar I returns to repeat the same operation on the following stitch, and so on at each revolution of the rotary shaft M by the means before described. The presser-lever bar J (shown with its presser-cam D and lever Z at Fig. 18) presses the yarn to the back part of the needles until the lifting-hook bar I gets under the stitch or loop, as before described. The presser-lever bar J has at one end a T-formed piece 28, taking into the groove of the presser-cam D. At the other end is a presser-piece $j^*$, fastened to the presser-lever bar J by screws. At right angles to the lower end of the presser-piece $j^*$ is cranked from one side a conically-formed pin 49. The presser-lever bar J has a fulcrum, as before explained, at 19 and a rest $b^*$ formed of hard wood. When a stitch or loop is about to be formed, the presser-lever bar J is brought by the motions of the presser-cam D and lever Z under and toward the back part of the needles, where it remains until the hook-bar I has acquired a hold of the stitch. The presser-lever bar J is then moved laterally from the stitch and forward toward the needle ends, at which time the hook-bar I has advanced with the stitch or loop to the front of the needles $b$, when the presser-lever bar J is raised by the presser-cam D and liberates the yarn from the hook-bar I, which process is repeated at each revolution of the rotary shaft.

Having thus described the nature of my invention and the manner in which the same is to be performed, I would have it understood that I do not confine myself to the details as herein shown and described so long as the peculiar character of my invention be retained; but

What I claim is—

The arrangement and combination of parts for working the presser-lever J, and the same in combination with the other apparatus and parts, as herein described.

JOSEPH WHITWORTH.

Witnesses:
JOHN DAVIES,
JOHN CONNAH, *both of Manchester.*